Jan. 23, 1962 — E. V. SCHAAL — 3,017,650
WINDSHIELD CLEANING SYSTEM
Filed Nov. 28, 1956 — 2 Sheets-Sheet 1
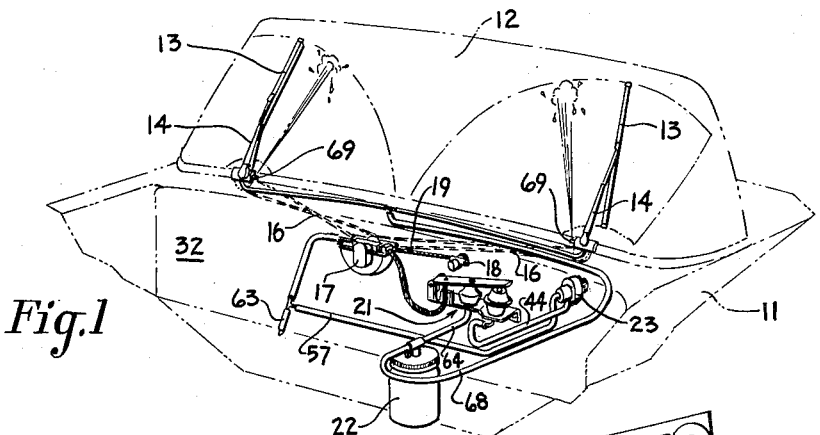
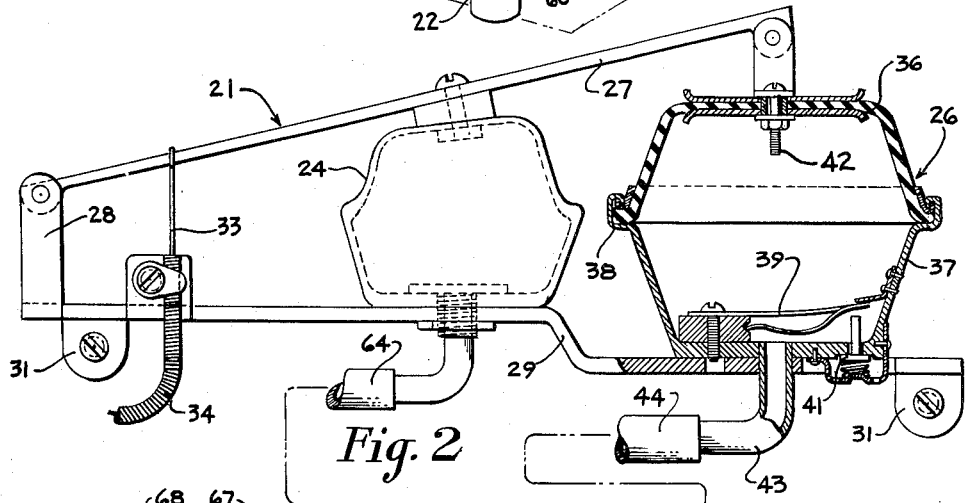
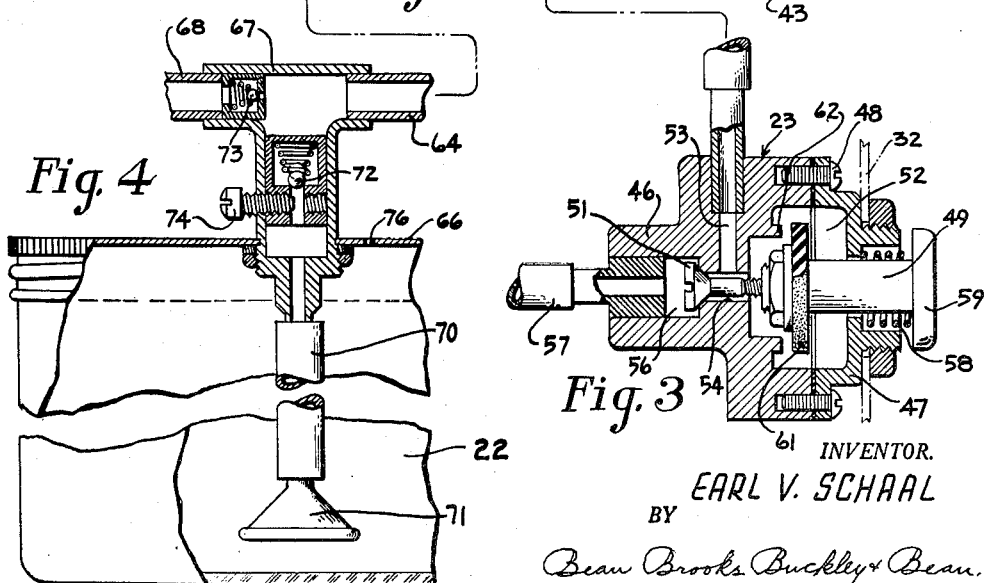
INVENTOR.
EARL V. SCHAAL
BY
Bean Brooks Buckley & Bean.
ATTORNEYS

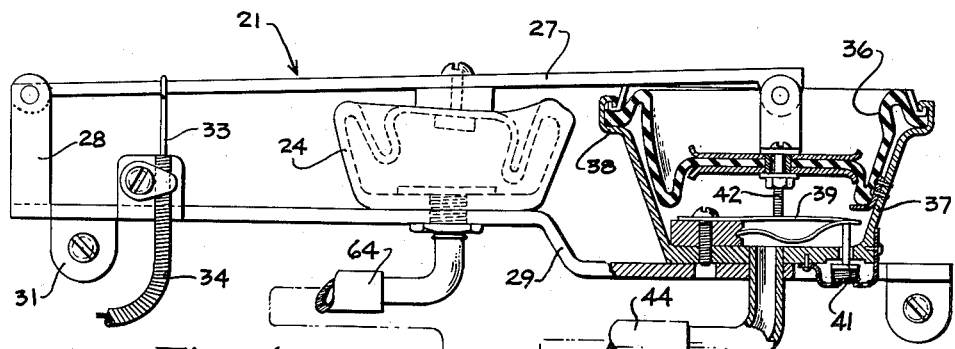
Fig. 5
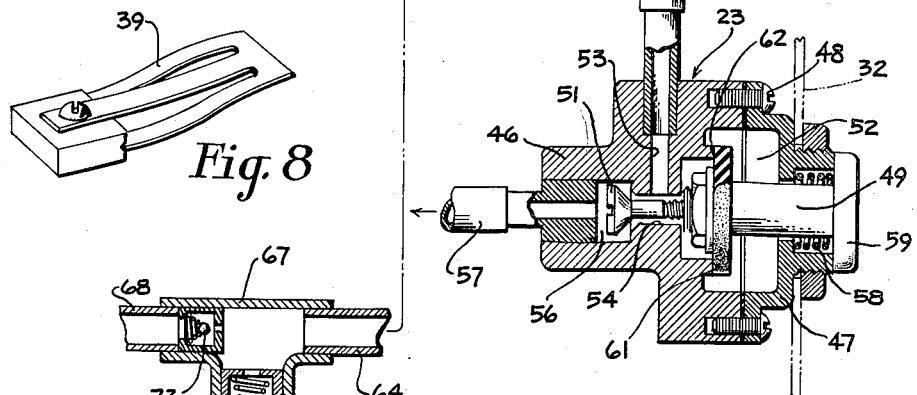
Fig. 8
Fig. 6
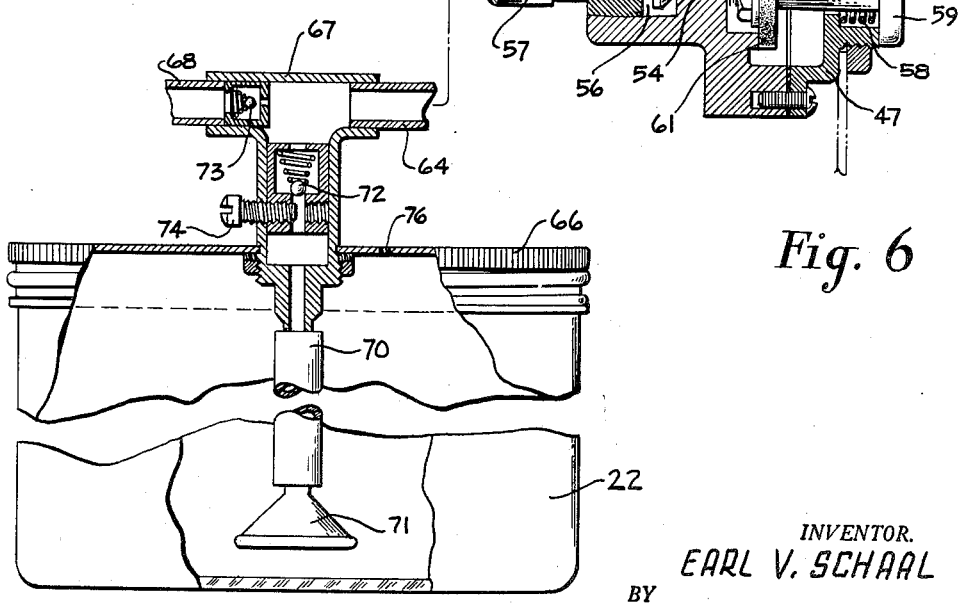
Fig. 7
INVENTOR.
EARL V. SCHAAL
BY
Bean Brooks Buckley & Bean.
ATTORNEYS United States Patent Office 3,017,650
Patented Jan. 23, 1962

3,017,650
WINDSHIELD CLEANING SYSTEM
Earl V. Schaal, East Aurora, N.Y., assignor to Trico Products Corporation, Buffalo, N.Y.
Filed Nov. 28, 1956, Ser. No. 624,878
9 Claims. (Cl. 15—250.02)

This invention relates to a vehicle windshield washing-wiping arrangement, and more particularly to a vacuum operated pump system for use in such an arrangement.

The arrangement of the invention features a windshield cleaning system providing instant liquid spray action followed by wiper motor operation all of which is initiated upon depression of a control valve button. Among other things, the arrangement of the invention features, substantial independence from spring action for operation, adjustable wiper motor control for prolongation of wiper motor operation after cessation of liquid spraying, simplicity of design contributing to low cost manufacture, and reliable operation.

The main object of this invention is to provide a windshield cleaning system having an instant liquid spray action followed by wiper motor operation, all of which is initiated upon depression of a control valve button.

Another object of this invention is to provide a vehicle windshield washer-wiper system which is substantially independent of spring action for operation.

Still another object of the invention is to provide a windshield cleaning system in which the wiper motor may be adjustably controlled to provide wiping action after cessation of liquid spraying.

Another object of the invention is to provide a vehicle washer-wiper system which is simple in design, of low cost manufacture, and reliable in operation.

These and further objects and features of the invention will become more apparent from the following description and the accompanying drawings wherein:

FIG. 1 is a fragmentary perspective view illustrating a vehicle windshield washer-wiper arrangement embodying the principles of the invention;

FIG. 2 is an elevation view, partially in section, showing a pump arrangement used in the system of the invention;

FIG. 3 is a sectional view of a control valve used in the arrangement illustrated in FIG. 1;

FIG. 4 is a fragmentary view in partial section of a reservoir and valve used in the arrangement illustrated in FIG. 1;

FIG. 5 is a view similar to FIG. 2 illustrating the pump in one position of operation;

FIG. 6 is a sectional view of the control valve illustrating an operative position;

FIG. 7 is a view similar to FIG. 4 illustrating the position of valve elements during operation; and FIG. 8 is a perspective view of a valve actuating spring used in the pump mechanism of the invention.

Referring now to the drawings, and more particularly to FIG. 1, numeral 11 identifies a motor vehicle having a windshield 12, which may be of the wraparound type, on which are mounted a pair of wiper blades 13 supported on wiper arms 14 for wiping predetermined areas of the windshield. The wiper arms 14 are each supported upon a rockshaft (not shown) which are oscillated by means of a flexible transmission, for example, cables 16 connected to a wiper motor 17, all in the usual manner. A control mechanism 18, positioned in the vehicle for convenient manipulation by the vehicle operator, is connected by means of a Bowden wire 19 to the valve assemblage of the wiper motor whereby wiper motor operation may be regulated by the vehicle operator.

A washer-wiper arrangement embodying the principles of the invention comprises a pump assemblage 21, a reservoir 22, and a control valve 23 all of which are connected in a manner as to provide a windshield washing and wiping cycle.

The pump assemblage 21 includes a bulb element 24 formed of a rubber-like material, a vacuum operative motor means 26, a lever 27 pivotally mounted at one end to an arm 28 and affixed to the top of the bulb element 24 and motor means 26, as best seen in FIG. 2. A bracket 29, adapted for the support of the bulb element 24 and motor means 26, has lugs 31 arranged for mounting the assemblage 21 within the vehicle engine compartment, preferably upon the forward surface of the firewall 32. Near the pivoted end of the lever 27 is affixed a wire 33 forming part of a Bowden wire 34, the opposite end of which is connected to the valve mechanism of the wiper motor 17 in a manner to control wiper motor operation as the lever 27 rotates about the pivot, as will be more clearly described hereinafter.

Motor means 26 is formed of a top cup-like portion 36 preferably made from a rubber-like material, and a bottom cup-like portion 37, preferably formed of metal, the latter portion having a flange 38 which is bent to snugly retain the edge of the top portion in an air tight manner. A cantilever type snap action spring 39 is arranged in the bottom portion 37 so that the free end will engage a spring loaded valve 41. Affixed to the top portion and projecting downwardly from the inner surface thereof, is a plunger 42 which is arranged for engagement with the spring 39 after a predetermined amount of downward movement of the top portion, as illustrated in FIG. 5. A pipe fitting 43, supported in the bracket 29 and opening into the bottom portion 37, is adapted for recepit of a hose, or conduit, 44 provided for the evacuation of air in the motor means 26 to cause a pressure differential which results in the downward movement of the top portion 36. Upon engagement of the plunger 42 with the spring 39, the latter will be flexed so that the end portion will engage the stem of the valve 41 to unseat the valve and allow flow of air under atmospheric pressure into the motor means 26. The spring 39, as best seen in FIG. 8, is designed to resist flexing movement until a predetermined force is applied, after which the free end of the lever will be quickly moved downward thus providing a rapid and complete unseating of the valve 41. Upon release of pressure on the spring 39, the energy stored in the curved side portions thereof will cause an unbending of the spring lever back into normal position, as shown in FIG. 2.

Control valve 23 includes a main housing 46, a cap 47 removably secured to the housing 46 by fastening means such as screws 48, and a reciprocable plunger 49 slidably supported in the cap and having an adjustable valve 51 threadably secured to the inner end thereof. A cavity 52 is formed within the housing 46 and the cap 47, while a passageway 53 and passageway 54 are arranged for connection with the cavity 52. The head of the valve 51 is located in a cavity 56 which is adapted for receipt of the end of a hose, or conduit 57. A spring 58 is compressively arranged between a head 59 of the plunger 49 and cap 47 whereby the valve 51 is normally maintained seated to cut-off communication between the cavity 56 and the passageway 54. A disc-like valve 61, supported on the plunger 49, is adapted for engagement with a circular seat 62 formed in the housing cavity 52, whereby communication between the cavity 52 and passageways 54 and 53 may be interrupted upon seating of the valve 61 on the seat 62.

Sufficient clearance is provided about the plunger so that the cavity 52 will be open to atmospheric pressure at all times. The hose 57 is connected to a hose 63 which leads to and is connected with a source of vacuum, such as the engine manifold, to provide negative pressure resulting in a pressure differential for the operation of the wiper motor and the motor means 26. It will be seen that when the plunger 49 is depressed, the valve 61 will engage the seat 62 and simultaneously the valve 51 will be unseated to thus connect passageways 54 and 53 with the source of vacuum via hose 57. When this occurs, the difference in pressure within the motor means 26 will cause inward flexing of the top portion 36, and at the same time will result in the maintenance of the valve 61 upon the seat 62 by virtue of such pressure differential. Downward movement of the top portion 36 will cause a rotation of the lever 27 about its pivot and will result in the collapsing of the bulb element 24 and movement of the wire 33 to initiate wiper motor operation.

Bulb element 24 normally contains a charge of cleaning fluid which is drawn from the reservoir via a hose 64. Secured to a cover 66 and screwed to the top of the reservoir 22, is a T connection 67 which receives the hose 64 and a hose 68. The hose 68 is bifurcated for connection with spray nozzles 69 arranged near the base of the wiper arms 14 and adapted for spraying cleaning liquid on predesignated areas of the windshield. A liquid intake pipe 70 secured to the T connection, extends downwardly into the reservoir and has an intake head 71 at the lower end thereof. A spring loaded check valve 72 is arranged in the T connection to allow one-way flow of liquid from the reservoir into the hose 64, while a spring loaded check valve 73 is located in the T connection to allow one-way flow of liquid from the hose 64 into the hose 68. A liquid flow restriction means in the form of a set screw 74, is arranged in the T connection and is adjustable for control of liquid flow from the reservoir into hose 64. The reservoir cover 66 has a vent 76 whereby the interior of the reservoir is open to atmospheric pressure at all times.

A washer-wiper cycle is initiated by the vehicle operator depressing the plunger 49 so that the valve 61 engages the seat 62 and simultaneously causes the unseating of the valve 51 from the end of the passageway 54. Such action connects the interior of the motor means 26 with the source of vacuum via the hose 44, passageway 53, passageway 54, cavity 56, and hose 57, resulting in a pressure differential on the top portion 36 causing it to move downwardly toward the bottom portion 37. Lever 27, being attached to the top portion 36 of the motor means 26, will be rotated about its pivot causing a collapsing of the bulb element 24 and forcing the water therefrom into the hose 64 past the check valve 73, into the hose 68 to the nozzles 69, which sprays the cleaning liquid upon the windshield. Simulaneously, movement of the wire 33 initiates wiper motor operation so that the wiper blades 13 will oscillate upon the wetted windshield. It is to be noted that spray action will automatically precede wiper motor operation because liquid is forced from the bulb element 24 as soon as the lever 27 is caused to rotate. Such action assures that the windshield will be wetted sufficiently in advance of movement of the wiper blades 13 thus eliminating, or reducing, any smearing of the windshield as would occur upon wiper blade movement passing over muddy deposit on the windshield.

Downward movement of the top portion 36 will continue until the plunger 42 engages the spring lever 39 and causes it to flex downwardly to unseat the valve 41. Such unseating of the valve 41 results in air flow under atmospheric pressure into the motor means 26, such air flow passing through the hose 44 and into passageways 53 and 54 to equalize the pressure on each side of the valve 61. When this occurs the spring 58 will urge the plunger 49 outwardly to cause the valve 61 to be moved away from the seat 62 and simultaneously seat the valve 51 upon the end of passageway 54. Air under atmospheric pressure will flow from the cavity 52 into passageways 54 and 53 and pass through the hose 44 and into the motor means 26, thus equalizing the pressure on either side of the top portion 36. The top portion 36, being of a resilient material, will spring back into its original shape causing a rotation of the lever 27 about its pivot in the opposite direction. Such action will result in the bulb element 24 being pulled upwardly toward its normal position and cause an intake of cleaning liquid from the reservoir past the check valve 72 and through hose 64. The rate of liquid flow into the bulb element 24 may be controlled by the position of the set screw 74 so that the rotary movement of the lever will be retarded, thus gradually pulling wire 33 to slowly move the slide valve of the wiper motor toward off position, thereby prolonging wiper motor operation. In such manner set screw adjustment may be made to prolong wiper motor operation for a predetermined period of time after cessation of liquid spraying upon the windshield.

From an understanding of the foregoing description it will be seen that the arrangement of the invention provides a windshield washer system having instant liquid spray action, which spraying begins slightly prior to wiper motor operation. In addition, wiping action may be adjustably prolonged after cessation of liquid spraying to assure complete wiping of the wetted surfaces.

The foregoing description has been given in detail without thought of limitation since the invention principles involved are capable of assuming other physical embodiments without departing from the spirit of the invention and the scope of the appended claims.

What is claimed is:

1. A windshield cleaning system comprising a liquid container arranged for response to a force to cause an ejection of liquid therefrom for spraying upon the windshield, a motor means operable in response to a fluid pressure differential to generate a force applicable to the liquid container for liquid ejection therefrom, force multiplying means interconnecting said motor means and said container, means responsive to operation of the motor means to initiate operation of a windshield wiper motor, a reservoir having conduit means for the supply of liquid to said container, and a control means for the establishment of a fluid pressure differential to cause operation of the motor means.

2. A windshield washer-wiper arrangement including a collapsible liquid container, conduit means connecting the liquid container to spray jets arranged for directing liquid streams upon predesignated areas of the windshield, a reservoir having conduit means for the supply of liquid to said container, a motor means connected to said container for movement therewith and including resiliently yieldable means operative by pressure fluid differential to collapse the liquid container, control means arranged for operation of said motor means, and means responsive to operation of the motor means to initiate operation of a wiper motor for oscillation of windshield wipers upon the sprayed areas of the windshield cessation of operation of the wiper motor being determined by the refilling of said container with liquid.

3. A windshield washer-wiper arrangement including a collapsible liquid container, conduit means connecting the liquid container to spray jets arranged for directing liquid streams upon predesignated areas of the windshield, a reservoir having conduit means for the supply of liquid to said container upon expansion of the latter from a collapsed condition, a motor means connected to said container and including a portion movable by pressure fluid differential to collapse the liquid container, including a resilient portion movable control means arranged for operation of said motor means, means responsive to container collapsing movement of the motor means portion to initiate operation of a wiper motor for oscillation of windshield wipers upon the sprayed areas of the windshield and to maintain such wiper motor operation pending return movement of said motor means portion, and adjustable means regulating the flow of liquid from said reservoir to said container for maintaining wiper motor operation for a predetermined time after cessation of liquid spraying upon the windshield.

4. A windshield washer-wiper arrangement including, a pivoted lever means, a vacuum operated motor means attached to the lever means for moving the same about its pivot, a collapsible liquid container attached to the lever means in offset relation to said motor means and to the pivot of said lever means for being collapsed upon movement thereof, a wiper motor control means attached to the lever means, a control valve adapted for connecting the motor means to a source of vacuum, a reservoir having conduit means for the supply of liquid to the collapsible container, and conduit means for conducting liquid from the collapsible container to spray nozzles for ejection of cleaning liquid upon the windshield.

5. A windshield washer-wiper arrangement including, a lever means pivotally supported at one end, a vacuum operated motor means attached to the free end of said lever means for moving the same about the pivot thereof, a collapsible liquid container attached to the lever means between the ends thereof for being collapsed upon movement thereof, a wiper motor control means adapted for actuation by the lever means, a control valve adapted for connecting the motor means to a source of vacuum, a reservoir having conduit means for the supply of liquid to the collapsible container, and conduit means for conducting liquid from the collapsible container to spray nozzles for ejection of cleaning liquid upon the windshield.

6. A windshield washer-wiper arrangement including, a lever means pivotally supported at one end, a vacuum operated motor means having a resiliently yieldable portion attached to the free end of said lever means for moving the same about the pivot thereof, a collapsible liquid container attached to the lever means between the ends thereof for being collapsed by movement thereof, a wiper motor control means adapted for actuation by the lever means, a control valve adapted for connecting the motor means to a source of vacuum, a reservoir having conduit means for the supply of liquid to the collapsible container, conduit means for conducting liquid from the collapsible container to spray nozzles arranged for ejection of cleaning liquid upon the windshield, valve means to allow flow of cleaning liquid from the reservoir to the collapsible container and to allow the flow of liquid from the collapsible container to the spray nozzles, and adjustable means to regulate liquid flow from the reservoir to the collapsible container and thereby regulate the return action of said lever means subsequent to motor means induced movement thereof.

7. A windshield washer-wiper arrangement including, a bracket having an arm portion, a lever means pivotally supported at one end on the arm portion, a vacuum operated motor means supported on the bracket and attached to the free end of said lever means, a collapsible liquid container supported on the bracket between said ends of said lever means and attached to the lever means for being collapsed by movement thereof, a wiper motor control means adapted for actuation by the lever means, a control valve adapted for connecting the motor means to a source of vacuum for pivoting said lever means in a direction to collapse said liquid container, means resiliently urging said lever means in a direction to expand said container, a reservoir having conduit means for the supply of liquid to the collapsible container, conduit means for conducting cleaning liquid from the collapsible container to spray nozzles arranged for ejection of cleaning liquid upon the windshield, valve means to allow flow of cleaning liquid from the reservoir to the collapsible container and to allow the flow of liquid from the collapsible container to the spray nozzles, and adjustable means to regulate liquid flow from the reservoir to the collapsible container and thereby regulate return movement of said lever means.

8. A windshield washer-wiper arrangement including a lever means pivotally supported at one end on a bracket, a vacuum operated motor means supported on the bracket and pivotally attached to the free end of said lever means, a collapsible liquid container supported on the bracket and attached to the lever means for being collapsed by movement thereof, a Bowden wire one end of which is attached to the lever means the opposite end of which is attached to a slide valve of a wiper motor for the operable control thereof, said vacuum operated motor means having a resiliently yieldable portion movable as a result of vacuum condition within the vacuum operated motor means and atmospheric pressure exterior thereof, a control valve having a plunger movable to unseat a valve to cause connection of a vacuum source with the interior of the vacuum operated motor means, said plunger being maintained by fluid pressure differential to maintain unseating of the valve, said vacuum operated motor means having a snap valve which is unseated after predetermined movement of the motor means movable portion so that atmospheric pressure will be admitted to the vacuum operated motor means resulting in the return movement of the movable portion to original position and simultaneously causing a balancing of pressure on said plunger of the control valve whereby the latter will be moved by spring action to original position to seat the valve and cut off connection of the vacuum operated motor means with the source of vacuum, a reservoir having conduit means for the supply of liquid to the liquid container, and an adjustable valve means to regulate flow of liquid from the reservoir into the liquid container.

9. In a windshield washer-wiper arrangement, a vacuum operated motor means having a resiliently flexible portion responsive to pressure differential, said flexible portion being affixed to a lever means movement of which compresses the liquid in a container to cause spraying of the liquid upon the windshield, and a control valve operable to connect the interior of the motor means with a source of vacuum, said control valve including a first valve arranged in a fluid circuit extending between the motor means and the source of vacuum and a second valve which may be manually seated and maintained in seated condition due to fluid pressure differential acting thereupon, said motor means having a trip valve arrangement operable to admit air under atmospheric pressure to the motor means after the flexible portion has moved a predetermined distance thus equalizing the pressures acting upon the flexible portion so that it will return to original position and simultaneously equalizing the pressure on the second valve of the control valve causing the return of said second valve to original position and resulting in a reseating of the first valve to disrupt the vacuum circuit connection with the motor means.

References Cited in the file of this patent

UNITED STATES PATENTS

| | | |
|---|---|---|
| 2,688,514 | Oishei et al. | Sept. 7, 1954 |
| 2,702,918 | Neufeld | Mar. 1, 1955 |
| 2,717,556 | Bartoo | Sept. 13, 1955 |
| 2,724,855 | Olin | Nov. 29, 1955 |
| 2,743,473 | Oishei | May 1, 1956 |

FOREIGN PATENTS

| | | |
|---|---|---|
| 997,554 | France | Sept. 12, 1951 |